UNITED STATES PATENT OFFICE.

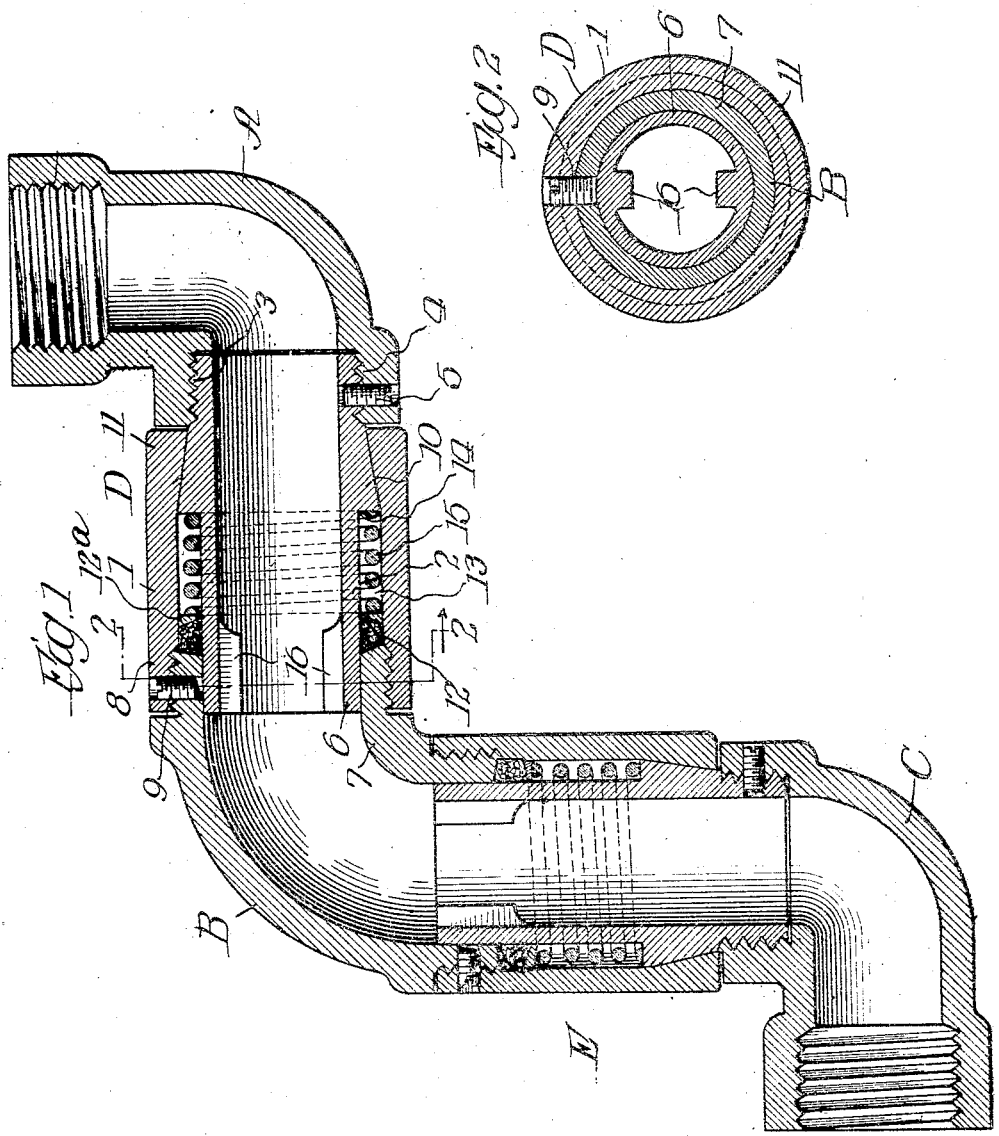

THOMAS H. MOONEY, OF SAN ANTONIO, TEXAS, ASSIGNOR OF ONE-HALF TO STEPHEN F. SULLIVAN, OF ST. LOUIS, MISSOURI.

FLEXIBLE JOINT.

1,160,639.

Specification of Letters Patent.

Patented Nov. 16, 1915.

Application filed October 29, 1913. Serial No. 797,964.

*To all whom it may concern:*

Be it known that I, THOMAS H. MOONEY, a citizen of the United States, residing at San Antonio, in the county of Bexar, State of Texas, have invented certain new and useful Improvements in Flexible Joints, of which the following is a specification.

My invention relates to improvements in flexible joints, and one of the objects of my invention is to provide an improved and simplified device of this character, which will be simple, durable and reliable in construction and effective and efficient in operation.

Other objects of my invention will appear hereinafter.

Referring to the accompanying drawings: Figure 1 is a central longitudinal section of a device embodying my invention, and Fig. 2 is a transverse sectional view on the line 2—2 of Fig. 1.

In the drawings I have shown my improved flexible joint in duplicate, the two units being connected together, for the purpose of illustrating the manner in which my device may be readily adapted to the various uses and requirements which a device of this character are intended to meet. Since both joints, however, are identical in so far as their construction is concerned a description of one of them will be sufficient for a clear understanding of my invention.

In the drawings I have shown the terminals A, B and C of the two joints in the form of elbows, but it will be obvious that they may be of any suitable form to meet the particular requirements. The terminal B, in the structure illustrated, serves as a common terminal for the two joints D and E, but it will be understood that the terminal B may be formed at one end for attachment to any pipe or connection wherein it is desired to use a flexible joint. The remote ends of the terminal members A and C are shown as internally threaded for connection to any suitable pipe. I provide two hollow cylindrical members 1 and 2 of different diameters. The cylindrical member 2 is of somewhat less diameter than the member 1 and is disposed concentrically within the member 1. These members are preferably made of such dimensions that the inner diameter of the member 2 is substantially equal to the inner diameter of the terminals A and C, so that a clear unobstructed passage will be provided from one terminal to the other through the member 2. One end 3 of the inner member 2 is threaded and is screwed into a correspondingly threaded end 4 of the terminal member A, this joint being made tight to prevent leakage. In order to prevent the relative rotation of the inner member 2 and the terminal member A I provide a set screw or other suitable fastening device 5, which, as shown in the drawings, passes through the ends of the two members 2 and A thereby locking them together. The other end 6 of the inner cylindrical or tubular member 2 is preferably smooth and snugly fits the end portion 7 of the terminal B in such a manner that the member 2 and the terminal member B may not only rotate relatively to each other but also move longitudinally. The end portion 8 of the outer tubular member 1 is internally threaded and is screwed upon the externally threaded end portion of the terminal member B and this member 1 is locked against relative rotation with respect to the terminal B by means of the set screw 9, similar to the set screw 5.

The inner tubular member 2 has an external annular enlargement or flange 10 of a diameter larger than the general diameter of the member 2, this flange being preferably formed integrally with the member 2. The periphery of this flange, as will be noted, is tapered toward the threaded end 3 of the member 2, and it is adapted to fit in the socket, or seat, so to speak, which is formed by a correspondingly tapered portion 11 at the other end of the outer tubular member 1, this portion 11 being, as clearly shown in Fig. 1, tapered oppositely to the tapered flange 10. This construction forms a fluid tight joint between the members 1 and 2, which permits the relative rotation between the members 1 and 2, and at the same time readily adapts itself to any wear occasioned by the rubbing of the two surfaces of the enlargement 10 and the portion 11. It will be noted however, that these tapered or beveled portions are completely removed, or isolated, from access by the fluid passing through the joint. This is obvious from the fact that the joint between the member 2 and the terminal A is a threaded connection, which may be made absolutely fluid tight, and the joint between the terminal B and the member 2 is considerably removed therefrom. In order, however, to further insure against leakage at the joint, or connection between the terminal member B and the inner tubular member 2, I provide a rubber, or other suitable gasket 12, in the annular space 13, between the two tubular members 1 and 2. This gasket is preferably in the form of a ring, which snugly fits the tubular member 2, and is preferably positioned abutting the end 7 of the terminal B. In the annular space 13 between the gasket 12 and the shoulder 14, formed by the annular enlargement of flange 10, I place a spring 15. This spring is preferably in the form of a coil expansion spring and is placed in this space under tension, so that it will force the two tubular members 1 and 2 longitudinally with respect to each other, and thereby firmly maintain the tapered enlargement 10 and portion 11 yieldingly seated. This spring also forces the gasket 12 yieldingly against the end of the terminal member, and also against the surface of the tubular member 2. I prevent the spring from crushing into the gasket by means of a metal ring 12ª. It will be noted that the surfaces or ends of both the gasket and metal ring are tapered in such manner that the tendency is to wedge the gasket against the end of terminal B and the surface of tube 1, thereby insuring holding the gasket firmly in place. I provide a couple of instanding projections in the end 6 of the inner tubular member 2, for the purpose of enabling a hold to be obtained upon the tubular member 2 when screwing it into the terminal A, or unscrewing it therefrom.

It will be noted that the more delicate parts, such as gasket 12, and the spring 15, are completely housed and thereby entirely protected against damage. It will also be noted that these parts are entirely removed from the fluid passing through the joint so that they are thereby protected against disintegration. My device may readily be connected to standard piping, or may be used in any of the places where flexible joints of this character are required. The parts are so constructed that complete relative freedom of movement is allowed the terminal members, without any danger of leakage due to this relative movement.

It will be understood by one skilled in the art, after obtaining an understanding of my invention from the disclosures herein, that my invention may be readily modified to meet the various requirements, without departing from the scope and spirit of the invention, and I do not wish, therefore, to be restricted to the particular construction shown.

What I claim is:

A flexible joint comprising a hollow fitting having one end tapered inwardly; an inner tubular member having one end slidably mounted in the bore of said fitting and an enlargement thereon spaced from the inwardly tapering end of the fitting; an outer tubular member over said inner tubular member, one of its ends engaging said enlargement and its other end threaded on said fitting; a gasket between said tubular members and against the tapering end of said fitting; a ring having one surface tapered oppositely to the tapered end of the fitting and adapted to wedge the gasket into the sharp corner between the end of the fitting and the inner tubular member sealing the joint between said inner member and said fitting; and a compression spring in a space between said tubular members and between said ring and said enlargement.

In testimony whereof I have signed my name to this specification, in the presence of two subscribing witnesses, on this 22nd day of October A. D. 1913.

THOMAS H. MOONEY.

Witnesses:
J. FRANK GALLAGHER,
D. D. MOONEY.